(No Model.)  6 Sheets—Sheet 1.

G. STITES.
MACHINE FOR COILING AND TEMPERING SPRINGS.

No. 280,529.  Patented July 3, 1883.

Witnesses

Thomas J. Bewley.

Joseph P. Ingram.

Inventor,

George Stites.

per Stephen Ustick Atty (No Model.) 6 Sheets—Sheet 2.

G. STITES.
MACHINE FOR COILING AND TEMPERING SPRINGS.

No. 280,529. Patented July 3, 1883.

Witnesses
Thomas J. Bowley.
Joseph P. Ingram.

Inventor
George Stites.
per Stephen Ustick, att'y (No Model.)

6 Sheets—Sheet 3.

G. STITES.
MACHINE FOR COILING AND TEMPERING SPRINGS.

No. 280,529. Patented July 3, 1883.

Witnesses.

Thomas J. Bewley.
Chas. A. Duy.

Inventor.

George Stites.
per Stephen Ustick. att'y (No Model.) 6 Sheets—Sheet 4.
G. STITES.
MACHINE FOR COILING AND TEMPERING SPRINGS.
No. 280,529. Patented July 3, 1883.
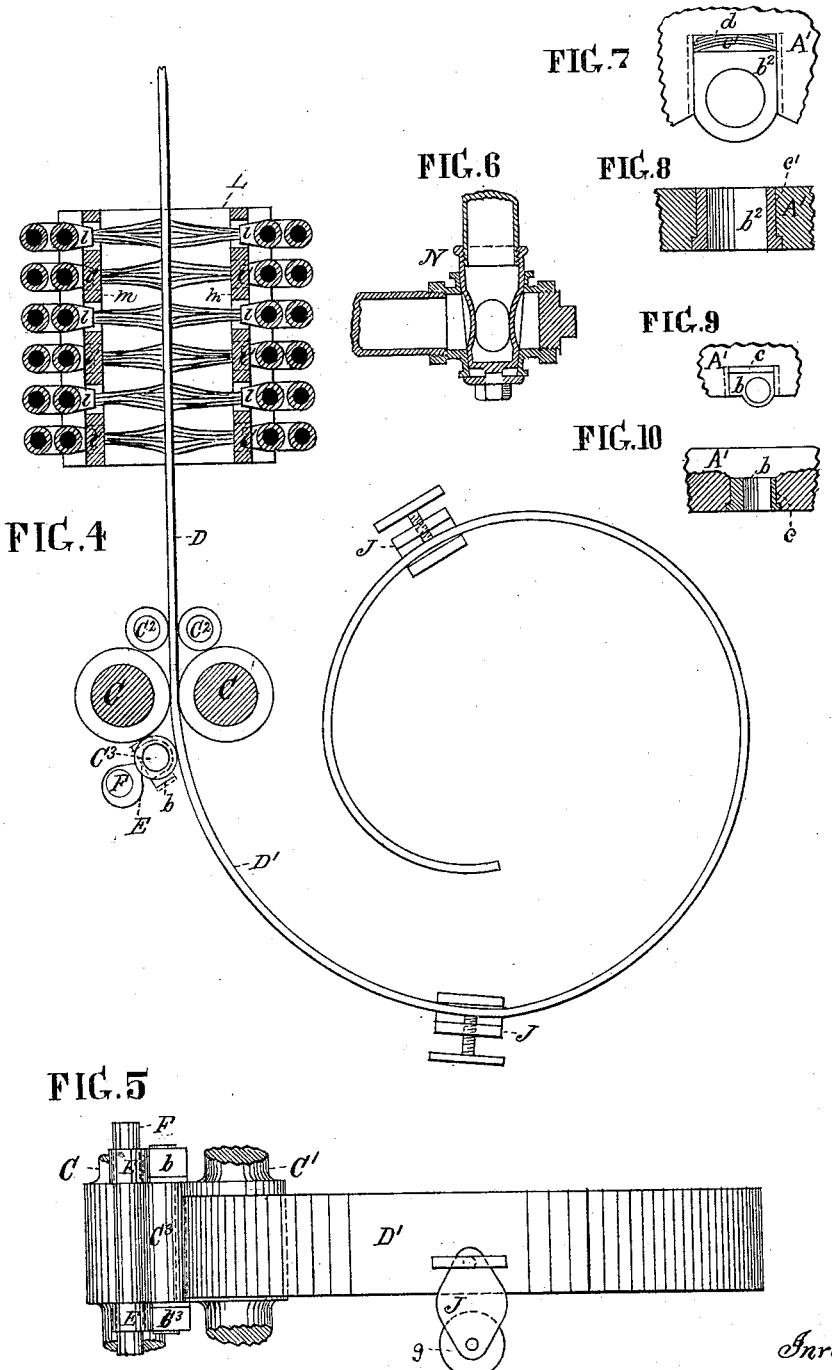
Witnesses.
Thomas J. Bewley.
Joseph O. Ingram.
Inventor
George Stites
per Stephen Ustick atty (No Model.) 6 Sheets—Sheet 5.
G. STITES.
MACHINE FOR COILING AND TEMPERING SPRINGS.
No. 280,529. Patented July 3, 1883.
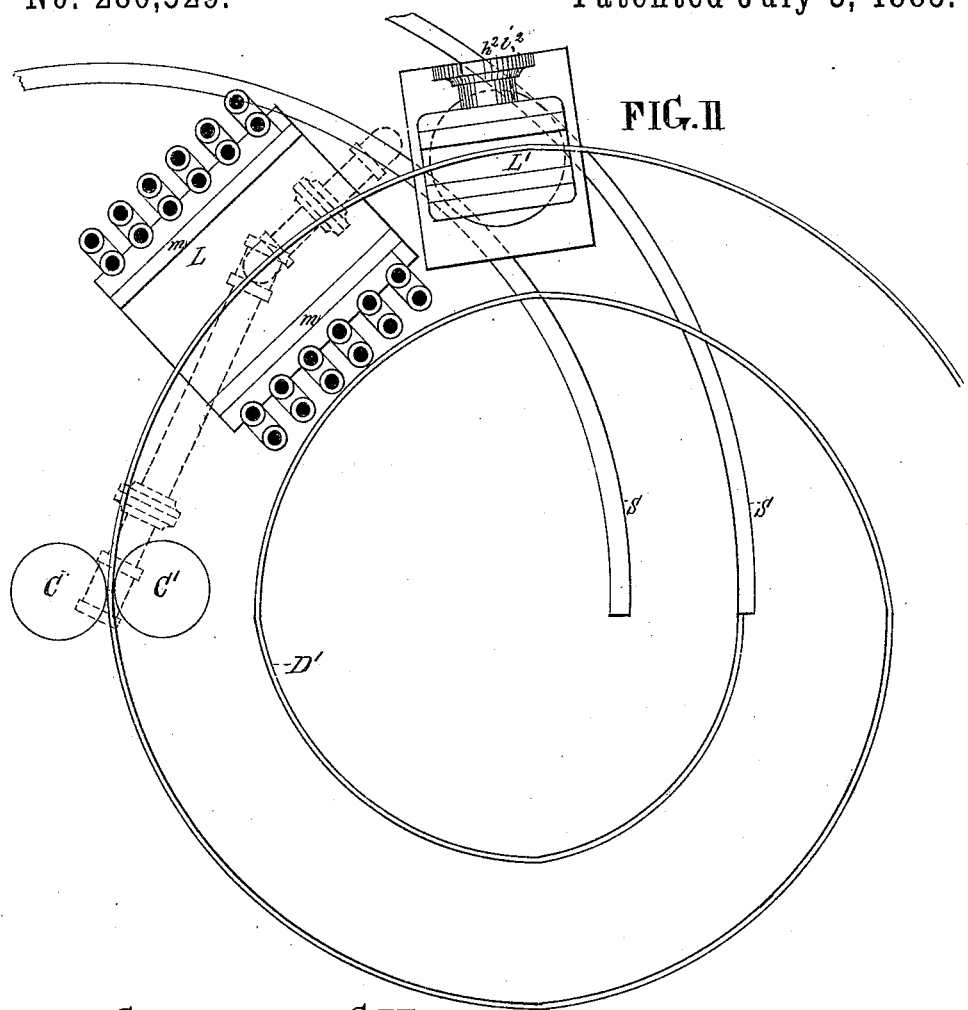
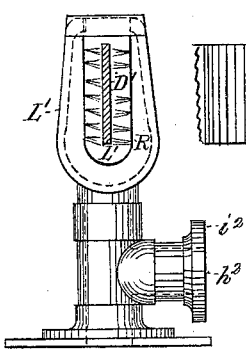
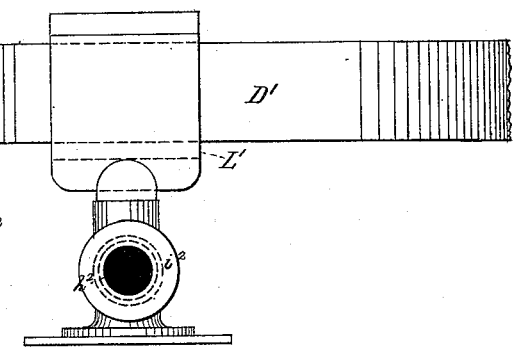
Witnesses
Thomas J. Bewley.
Joseph P. Ingram.
Inventor
George Stites
per Stephen Ustick, att'y (No Model.) 6 Sheets—Sheet 6.

G. STITES.
MACHINE FOR COILING AND TEMPERING SPRINGS.

No. 280,529. Patented July 3, 1883.

Witnesses.
Thomas J. Bewley.
Chas. A. Dey.

Inventor
George Stites.
per Stephen Ustick, Atty.

N. PETERS, Photo-Lithographer, Washington, D. C.

UNITED STATES PATENT OFFICE.

GEORGE STITES, OF PHILADELPHIA, PENNSYLVANIA, ASSIGNOR TO CHARLES MACE, OF SAME PLACE.

MACHINE FOR COILING AND TEMPERING SPRINGS.

SPECIFICATION forming part of Letters Patent No. 280,529, dated July 3, 1883.

Application filed December 2, 1882. (No model.)

*To all whom it may concern:*

Be it known that I, GEORGE STITES, a citizen of the United States, residing at Philadelphia, in the county of Philadelphia and State of Pennsylvania, have invented a new and useful Improvement in a Machine for Coiling and Tempering Springs for Car-Motors, &c., of which the following is a specification.

My invention consists of a machine which is provided with cams, in combination with feed-rollers and other devices, whereby sheets or strips of steel of any desirable length are brought each into a continuous coil, being softened by passing through a heating-chamber preparatory to the coiling operation. They are afterward passed through the machine and heating-chamber and subjected to a proper heat (continuously) for tempering them, after which they pass through the chilling-chamber. The construction and operation of the coiling and tempering machine are hereinafter fully described. Although the title above relates to springs for car-motors, I design the invention for all springs for which it is applicable.

Figure 1:
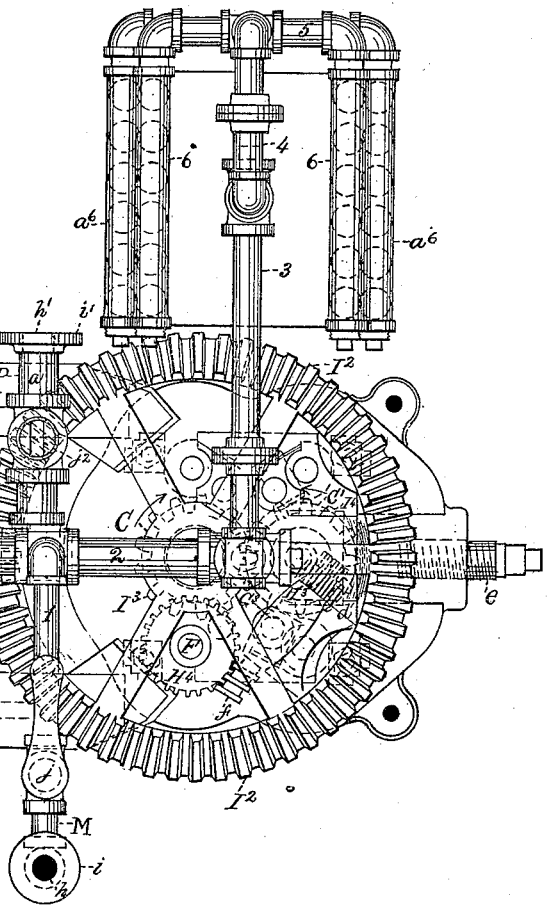
Figure 2:
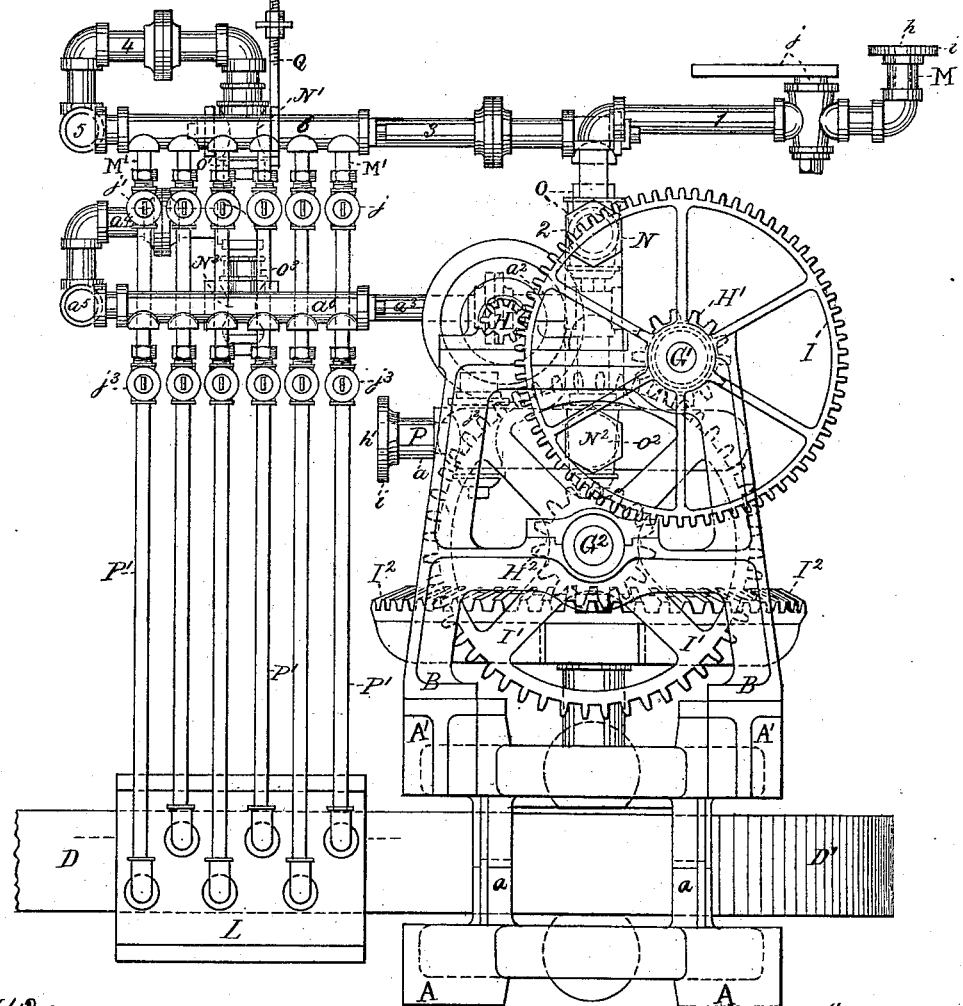
Figure 3:
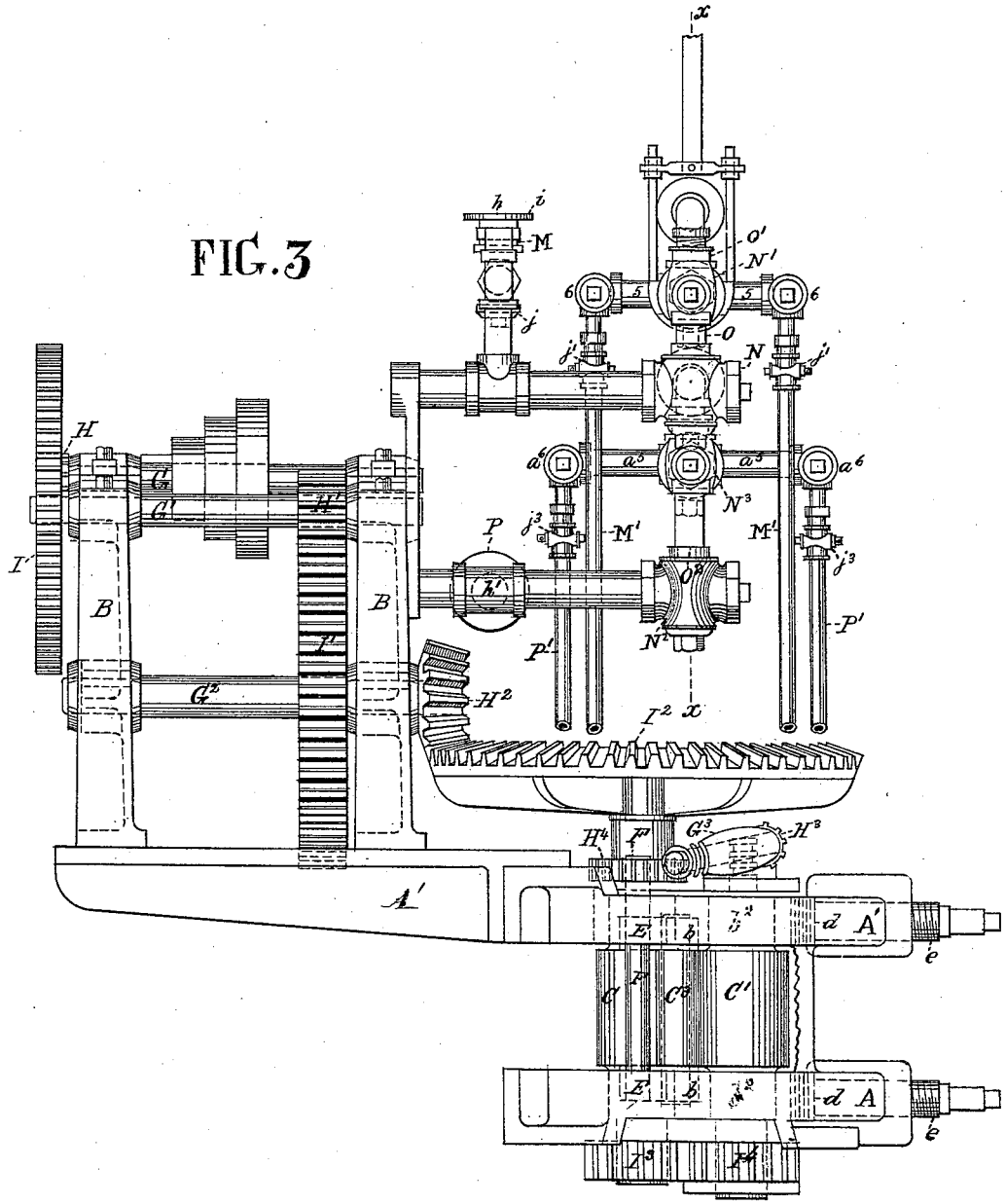
Figure 14:
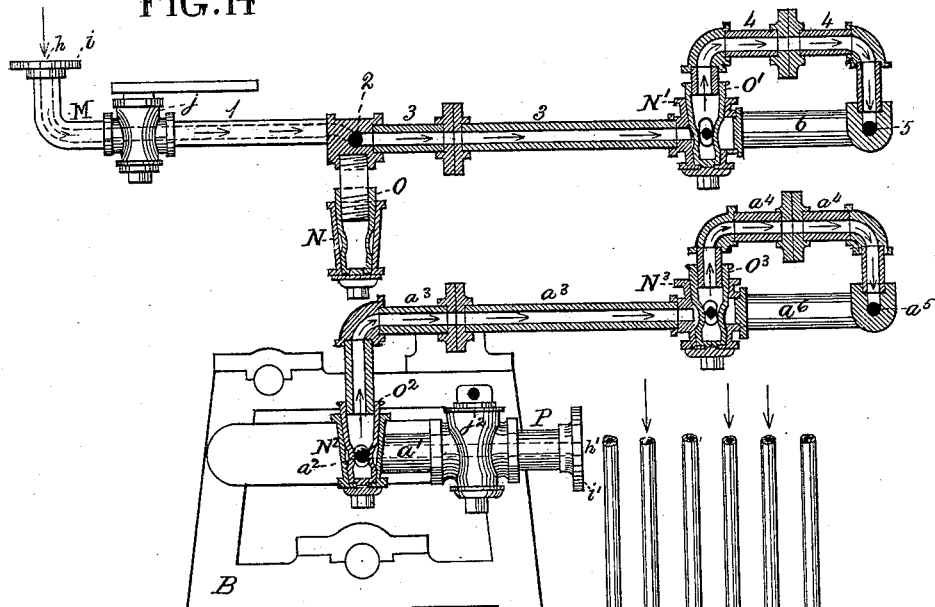
Figure 15:
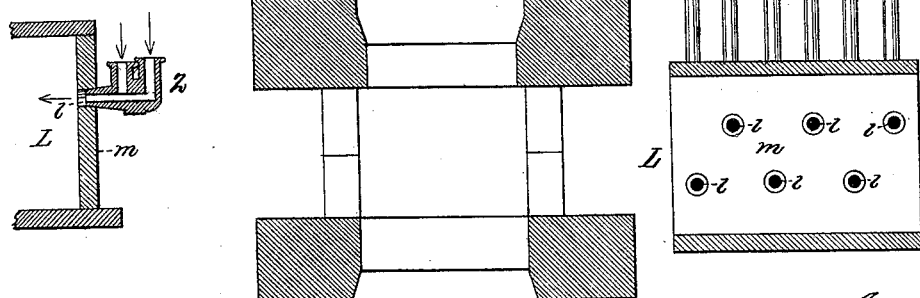

In the accompanying drawings, which make a part of this specification, Figure 1 is a plan view of the machine. Fig. 2, Sheet No. 2, is a front elevation of the same. Fig. 3, Sheet No. 3, is a side elevation. Fig. 4, Sheet No. 4, is a diagram of a portion of the inner end of the coiled spring D' and coiling and heating devices and the heating-chamber L. Fig. 5 is a side elevation of the coiling devices. Fig. 6 is a vertical section of a universal joint, N, having a plug, O. Figs. 7 and 8 are respectively a top view and vertical section of a sliding journal-bearing, $b^2$, of the front feed-roller, C'. Figs. 9 and 10 are like views of one of the bearings $b$ of the presser-roller $C^3$. Fig. 11, Sheet No. 5, is a diagram of the feed-rollers C and C', and chilling-chamber L', and coiling devices, and part of spring D'. Figs. 12 and 13 are views at right angles with each other of the chilling-chamber L' in elevation. Fig. 14 is a vertical section at line $x$ $x$ of Fig. 3. Fig. 15 is a vertical section of the fitting Z.

Like letters of reference in all the figures indicate the same parts.

The standing parts of the machine are the horizontal frames A and A', connecting-posts $a$ $a$ $a$ $a$, and housings B B.

C and C' are rollers which feed the sheets D during the coiling and tempering operations, and $C^2$ $C^2$ are guide-rollers for the sheets or strips. In order to coil the spring with proper curvature from end to end in its forward movement from the feed-rollers C and C', I employ a roller, $C^3$, for deflecting it from a straight line, and to graduate the curvature of the coil the journals of said roller have bearings $b$ $b$, which are adapted to slide in the slots $c$ $c$ of the base-frames A and A', as they are pressed upon by the revolving cams E E, which are situated on the ends of the revolving shaft F, the cams being of the proper curvature to give the right shape to the spring from end to end, as they impinge upon said bearings $b$ $b$ from the point of commencement near the shaft to their extreme termination during one revolution of the shaft F, the latter having a geared connection with the feed-rollers C and C', as hereinafter described. The journal-bearings of the feed-roller C have a fixed position in the base-frames A and A', but the bearings $b^2$ $b^2$ of the roller C' are permitted to slide in the slots $c'$ $c'$, being pressed upon by the elliptical springs $d$, as shown in Figs. 7 and 8, to cause the requisite pressure upon the sheet D to insure an accurate feeding of the same. The pressure is regulated by means of the screws $e$ $e$, as represented in Figs. 1 and 3.

The revolutions of the rollers C and C' are given by means of the driving-shaft G, having a pinion, H, gearing into the wheel I on the shaft G', the pinion H' on said shaft gearing into the wheel I' on the shaft $G^2$, and the bevel-pinion $H^2$ on said shaft gearing into the bevel-wheel $I^2$ on the upper end of the feed-roller C, and the said roller having a geared connection with the roller C' by means of the spur-wheels $I^3$ and $I^4$, respectively, on the lower ends of said rollers; and as the feed-rollers are revolved in the direction of the arrows the spring-sheet D is fed forward with suitable velocity for its being properly heated for softening as it passes through the heating-chamber L, preparatory to being coiled by the action of the revolving cams E E and roller C', above described. Simultaneously with the forward movement of the sheet D, in its passage through the heating-chamber L, the cams are revolved by means of the connection of the shaft F of the cams with the feed-roller C', there being a thread, e, on the neck of the upper end of said roller which gears into the pinion H³ on the upper end of the inclined shaft G³, the other end of the shaft having a worm, f, which gears into the pinion H⁴ on the upper end of the said cam-shaft. The gearing of the cam-shaft is constructed, after accurate calculations, to give the right velocity to the shaft to terminate the action of the revolving cams with the sheet of steel D when the coiling is finished. As the spring D' is coiled and advances from the coiling devices, carriers J are connected with each round, as represented in the diagram, Fig. 4, the wheels g resting on the floor to prevent friction, and thus facilitate the free turning around of the spring.

The heating apparatus is constructed as follows:

M is a pipe for supplying the heating-chamber L with gas, which is introduced by means of a hose connected with the inlet-opening h by means of the flange i, the pipe having a stop-cock, j, for cutting off the supply of gas. For the purpose of giving adjustability to the heating-chamber L, the pipe M, as shown in the drawings, is made in sections 1, 2, 3, 4, and 5, and branch sections 6 6, which are connected with the ends of the cross-section 5, as more clearly shown in Fig. 1. Projecting from the sections 6 6 are the series of vertical pipes M', which are connected at their lower ends, by means of fittings Z, with the heating-chamber L, the fittings terminating with nozzles l, which are inserted in suitable openings of the vertical sides m m of the chamber, whereby as the gas flows through the continuous sections and branches of the pipe M it is thrown in jets upon the opposite sides of the sheet D, as seen in Fig. 4, to uniformly heat it as it passes through the chamber. The pipes have stop-cocks j' at their upper ends to regulate the supply of gas to the nozzles or burners. To give flexibility to the combined pipe M, so as to provide for changing the position of the heating-chamber L, as hereinafter described, there is a universal joint, N, at the junction of sections 2 and 3, which is provided with a plug, O, that has a permanent connection with section 2, and there is a like joint, N', which has a plug, O', at the junction of sections 3 and 4, the plug having a permanent connection with section 4. One of these joints is shown in detail in Fig. 6.

P is an air-pipe, through which air is forced by any suitable device into the heating-chamber L to promote the combustion of the gas, the air entering the inlet-opening h' from a hose connected with the flange i'. The pipe is provided with a stop-cock, j², for cutting off the supply of air. For the same purpose as stated in relation to the gas-pipe M this pipe is also made in sections, which are lettered a', a², a³, a⁴, and a⁵, the latter having branch pipes a⁶ a⁶, as more clearly seen in Fig. 1. There is a series of vertical pipes, P', connected at their upper ends with each branch pipe a⁶, and at their lower ends with the fittings with which the branch pipes M' are connected, as described above, the openings which receive them connecting with the gas-passages which lead into the heating-chamber L, as shown in Fig. 15, whereby as the air is forced through the pipe P and its continuous sections and their branch pipes it mixes with the gas as the latter enters said heating-chamber and promotes the combustion, the intensity of the jets being regulated by means of the stop-cocks j³. In order to give flexibility to the air-pipe P for the same purpose as stated in relation to the gas-pipe M, there is a universal joint, N², at the junction of the sections a² and a³, and a like joint at the junction of the sections a³ and a⁴, having, respectively, plugs o² and o³. These universal joints and plugs are exactly like those of the gas-pipe M, one of which is represented in detail in Fig. 6. When the coiling of the spring D' is completed, the guide-rollers C² C² and the coiling device, consisting of the presser-roller C³ and the shaft F, having coiling-cams E E, are removed out of the way and the spring is turned around far enough to bring the outer end of the coil into connection with the feed-rollers C C', as represented in the diagram, Fig. 11, Sheet No. 5, the heating-chamber L being adjusted into proper position for such connection by the gas-pipe M and air-pipe P, turning upon the plugs O and O², respectively, the pipes being turned around by hand or any suitable means. In order to relieve the connection of these pipes with the frame of the machine of the weight of the series of pipes and the heating-chamber, there is a vertical strap projected from the point X, which is provided with a friction-wheel that rests upon a circular railway, on which it runs as the connected pipes are turned around. The railway is not shown in the drawings. The chilling-chamber L' is further adjusted as may be necessary to suit the direction of the coil of the spring D' as it passes through the chamber by giving the sections of the pipes M and P a suitable turn from time to time on the plugs O' and O³, respectively. As the spring D' is fed through the heating-chamber L and subjected to the proper heat for tempering, it passes through the chilling-chamber L', which is shown in position in the diagram, Fig. 11, and in detail in Figs. 12 and 13, and is chilled suitably for tempering by a blast of cold air, which is forced through a hose connected with the flange i of the inlet-opening h² of the chilling-chamber, and passes through perforations in its opposite branches upon the opposite side of the spring D'.

S is a circular railway upon which the chilling-chamber L' is placed, and arranged, as shown, in proper position with the heating-chamber L, and shifted from time to time, as may be necessary in accommodation to the position and range of the coil. As the point at which the spring turns in coiling is where the feed-rollers impinge on its surface, the railway is made concentric with said point, and hence the chilling-chamber is readily adjusted to the spring at any point of the coil as the spring passes through it.

The plan of heating and chilling straight springs continuously as they are passed through a stationary heating-chamber and a chilling-chamber in combination therewith is shown in the patent of Hiram A. Kimball, dated February 15, 1881, and numbered 237,754; but the peculiar construction of the heating and chilling apparatus, whereby adjustability is given to the heating and chilling chambers, which adapts them to tempering coil-springs, is believed to be new and to have been originated by me.

I claim as my invention—

1. The combination of the feed-rollers C and C', presser-roller $C^3$, and shaft F, having cams E E, substantially in the manner and for the purpose set forth.

2. The combination of the coiling mechanism, substantially as described, with the heating apparatus for coiling springs by a continuous operation, substantially as described.

3. The shifting carriers J, having friction-wheels $g$ for facilitating the movement of the spring D' as it is adjusted, substantially as described.

4. The combination of the gas-pipe M and air-pipe P, made in sections, and connected together by means of universal joints N, N', $N^2$, and $N^3$, having keys O, O', $O^2$, and $O^3$, and branch pipes, substantially as described, with the heating-chamber L, the frame of the machine being relieved of the weight of the pipes and heating-chamber by means of an elevated railway and connecting-strap, substantially as described.

5. The adjustable chilling-chamber L', jointly with the heating-chamber L, in combination with the gas and air pipes M and P, substantially in the manner and for the purpose set forth.

6. The adjustable chilling-chamber L', jointly with the railway S, substantially as and for the purpose set forth.

GEORGE STITES.

Witnesses:
THOMAS J. BEWLEY,
STEPHEN USTICK.